Patented Nov. 24, 1942

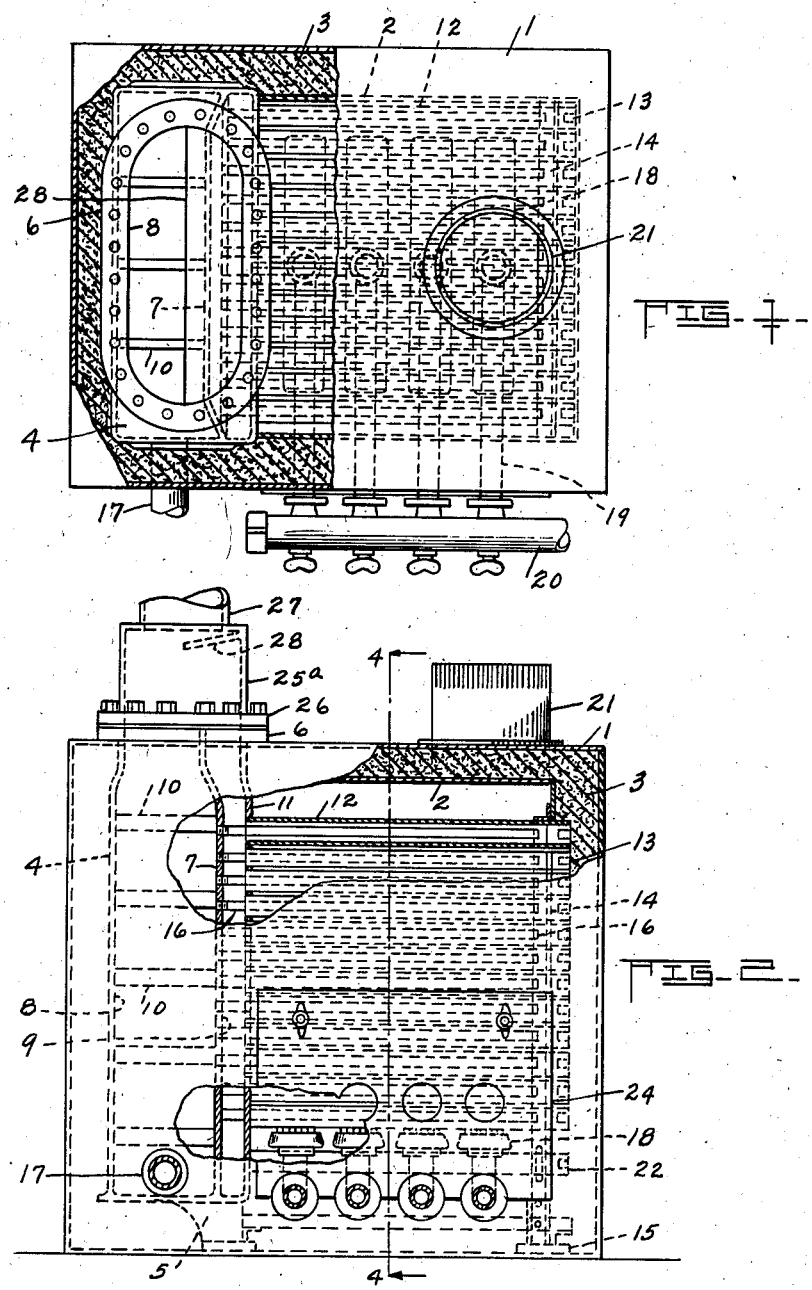

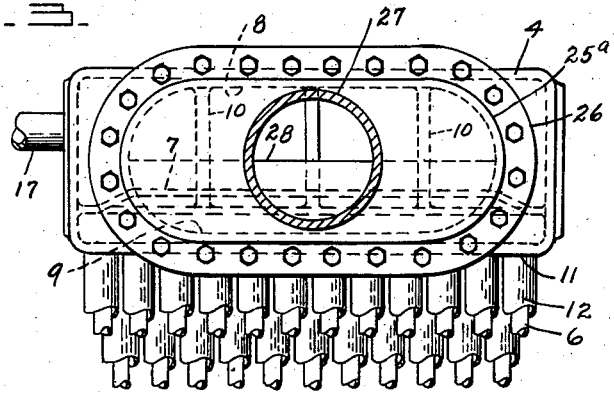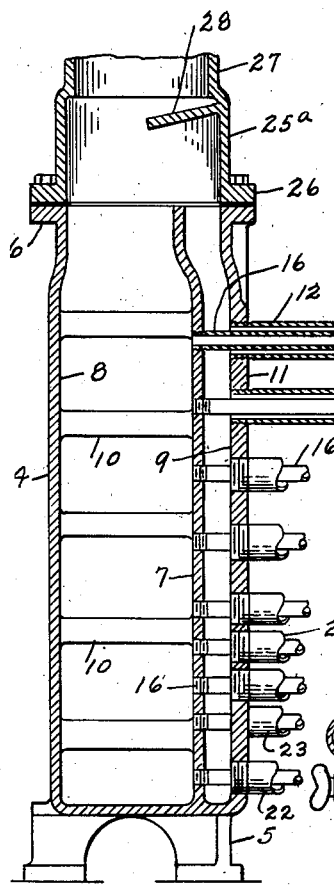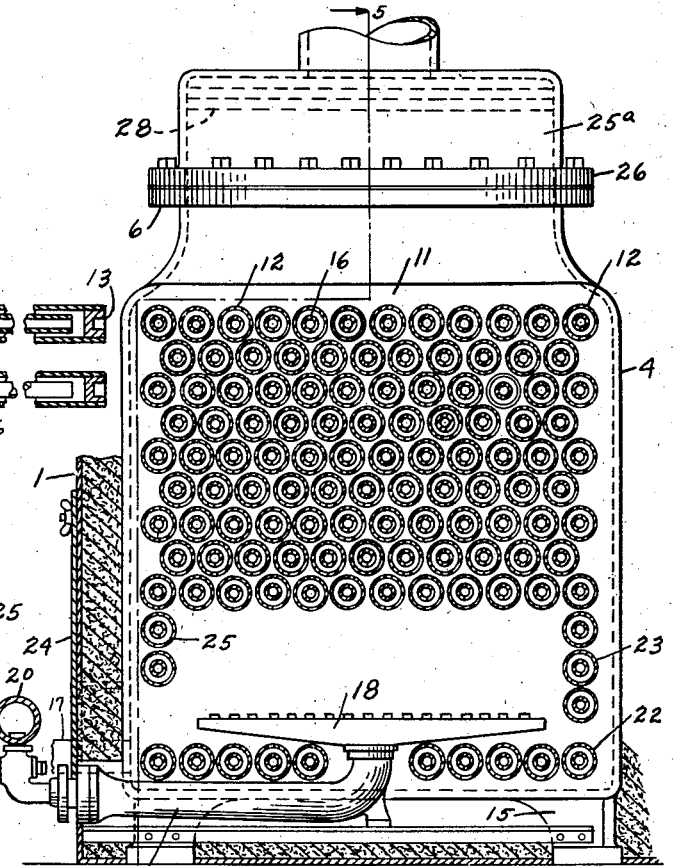

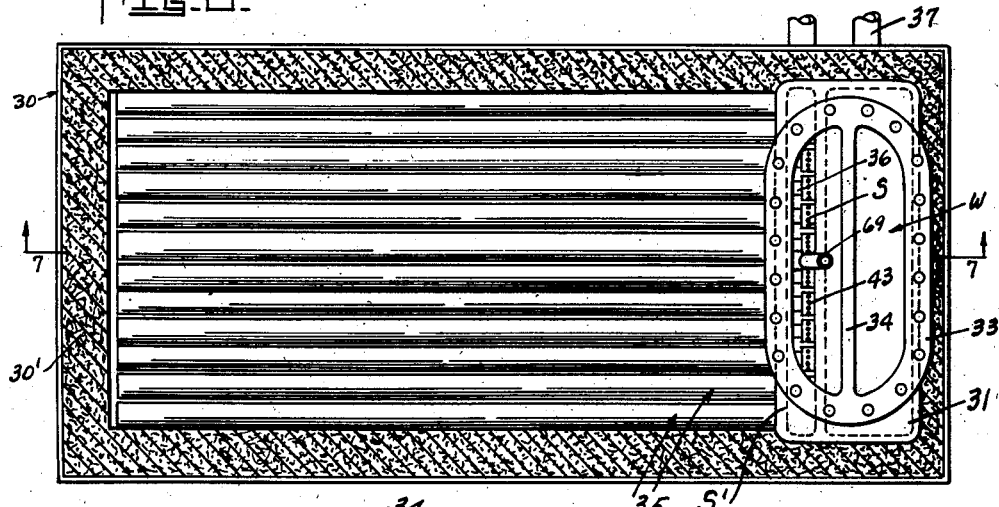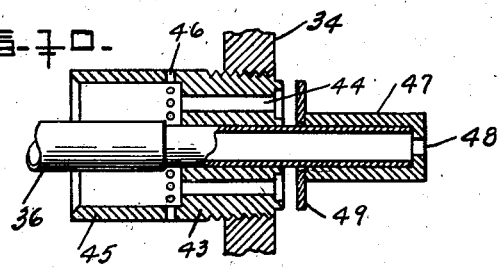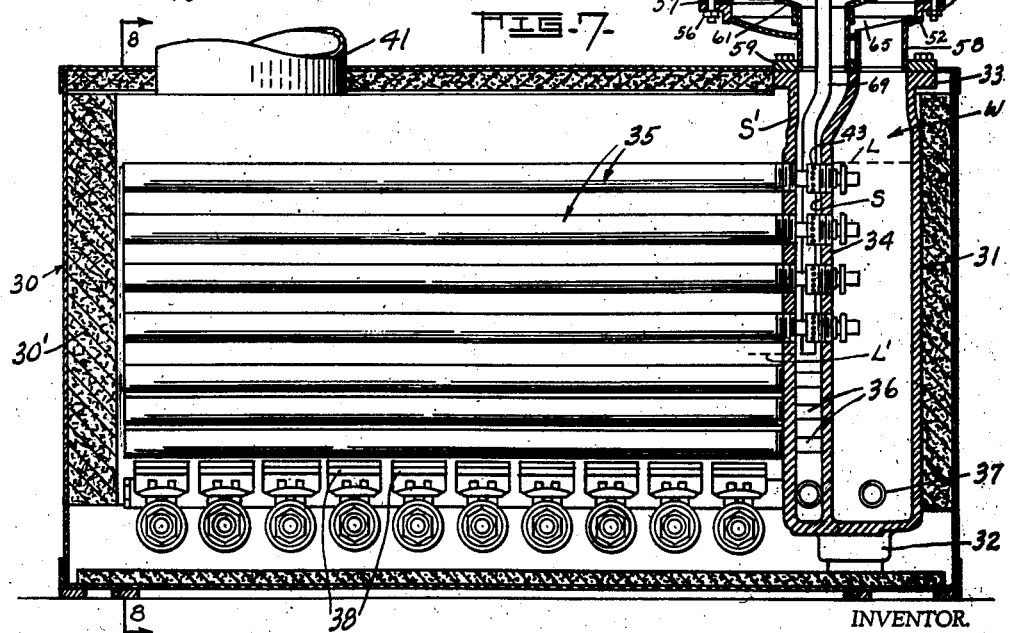

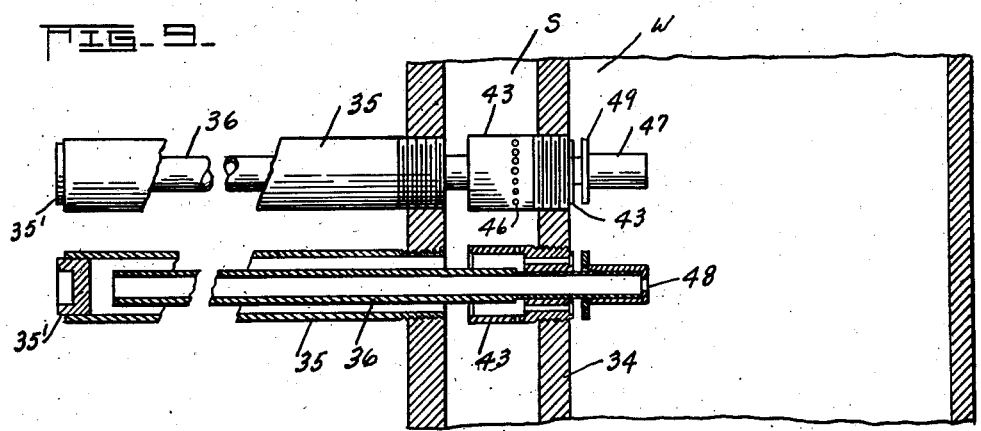
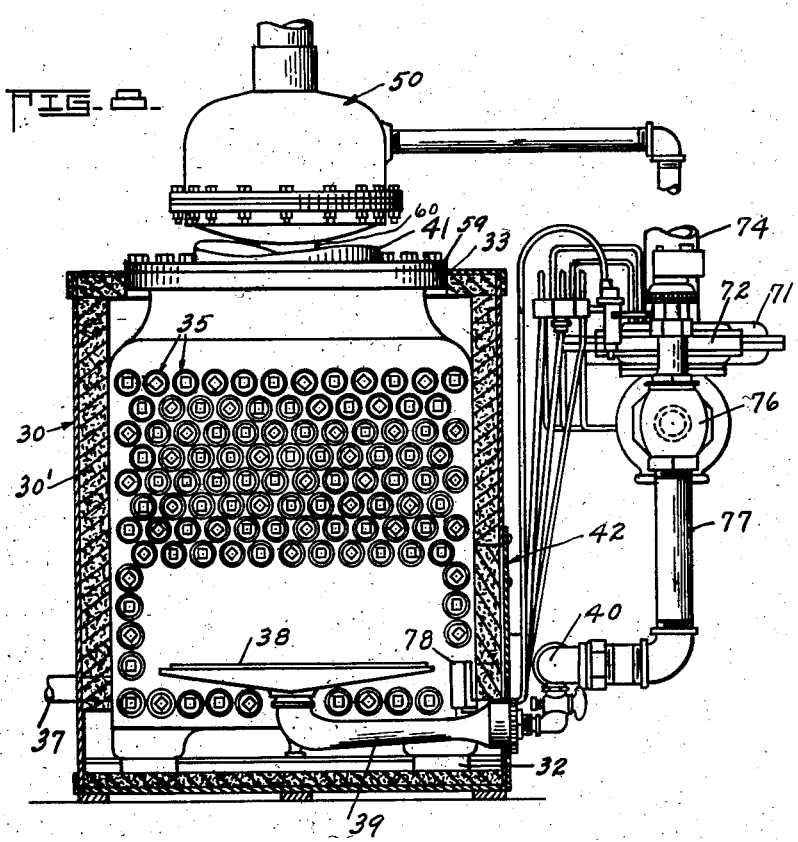

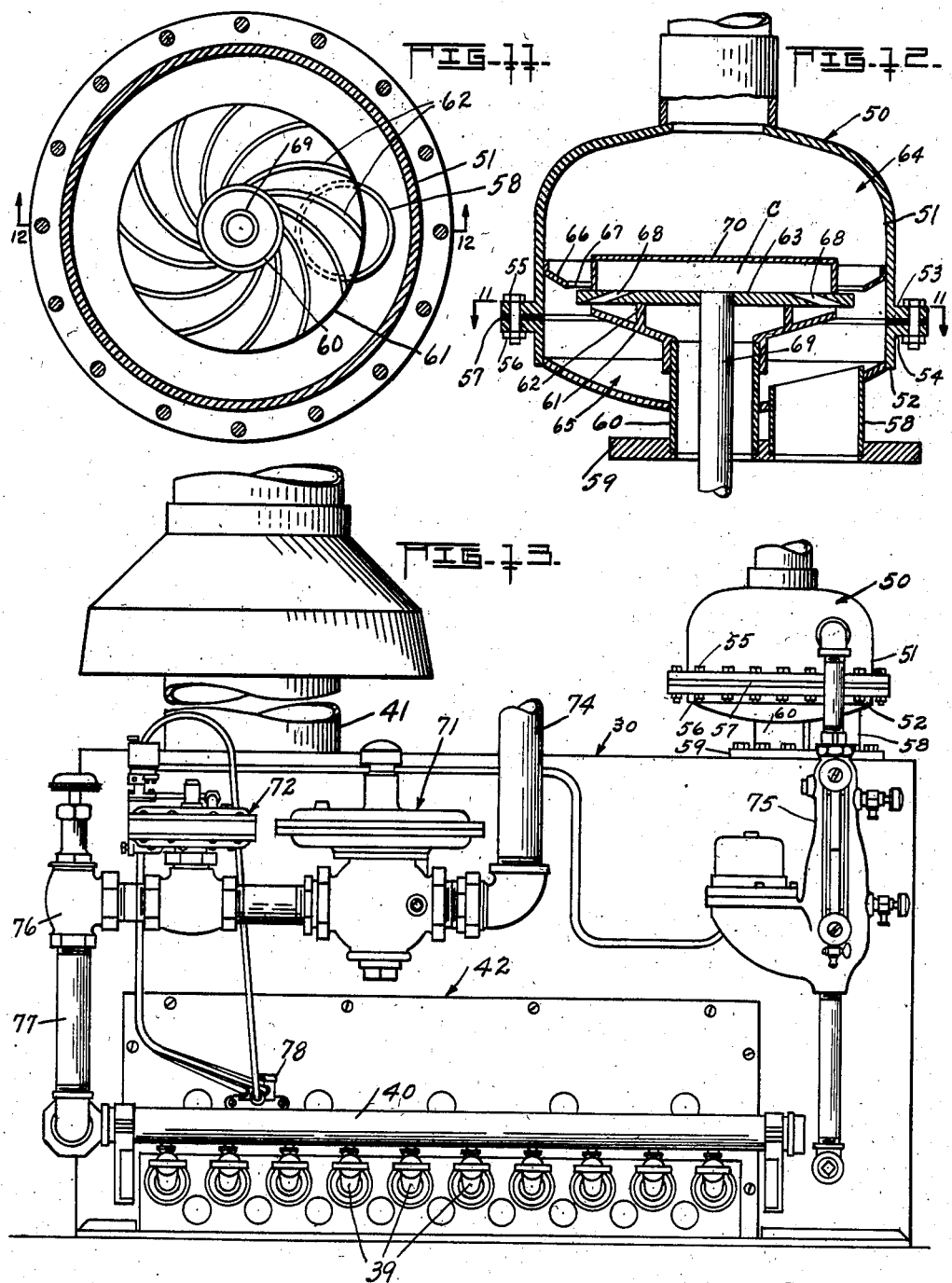

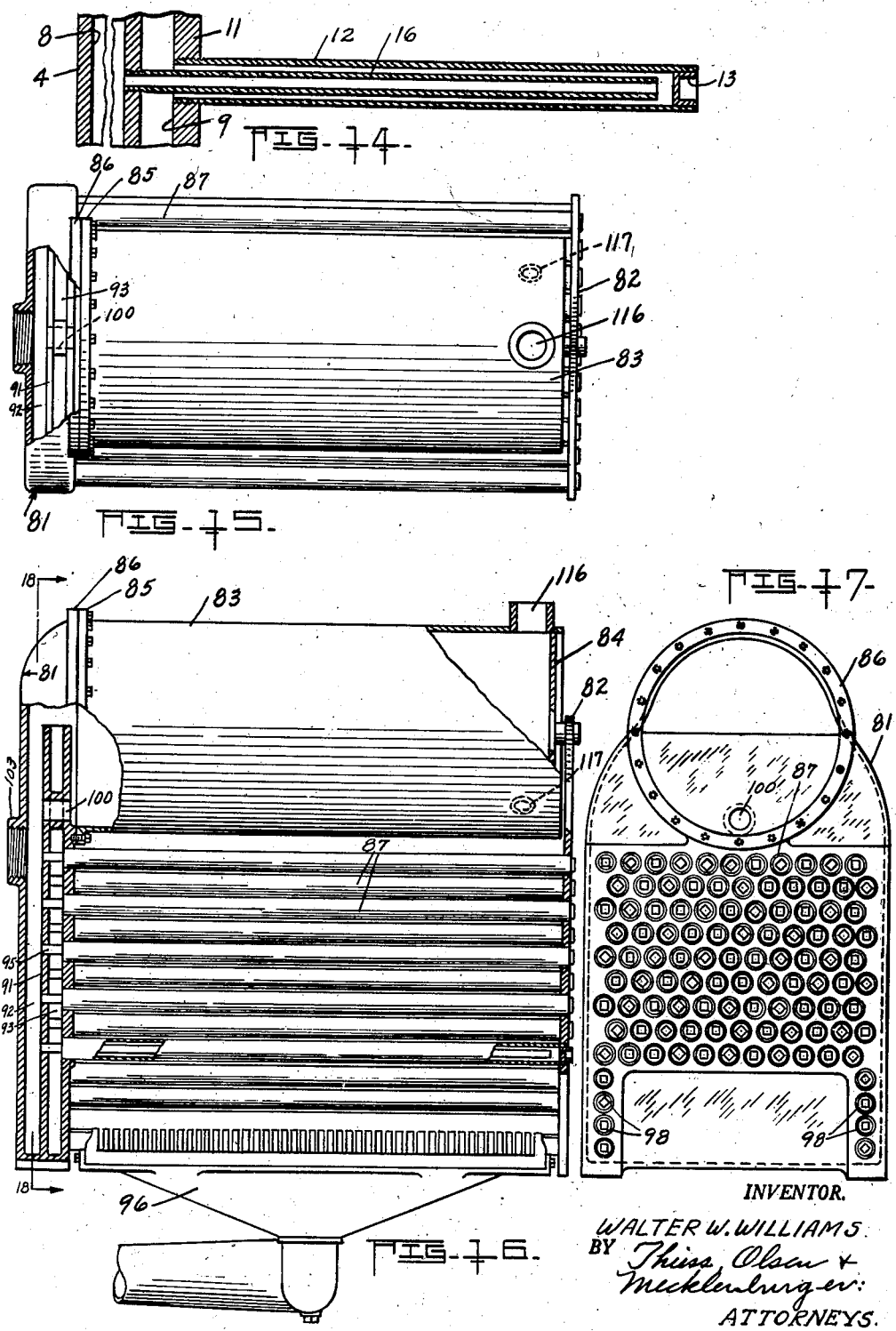

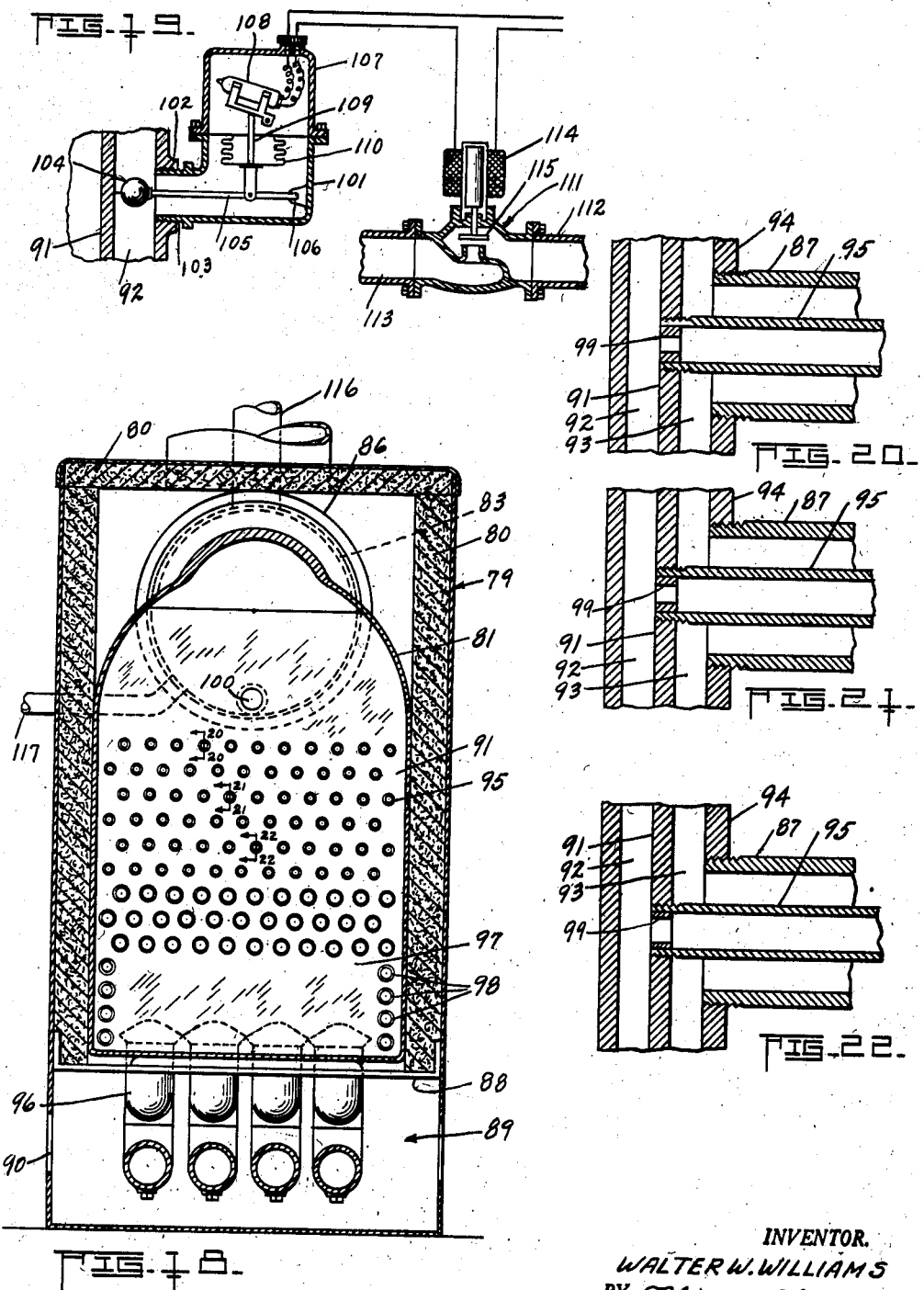

2,303,102

UNITED STATES PATENT OFFICE 2,303,102

HEATER

Walter W. Williams, Chicago, Ill.

Application July 26, 1940, Serial No. 347,634

23 Claims. (Cl. 122—316)

This application is a continuation in part of my application Serial Number 263,821, filed on March 3, 1939, and entitled "Heaters."

This invention relates to heaters and has special reference to a steam generator for use as a source of steam supply for heating or cooling systems of domestic or commercial installation and, because of its being a self-contained unit of small size, may be used universally as a source of power.

More particularly, this invention relates to a steam generator that comprises a casing and a generator head within the casing, the generator head being partitioned to provide therein a water chamber and a steam chamber. A plurality of rows of firing tubes closed at one end communicate with the steam chamber and a plurality of rows of water tubes open at both ends communicate with the water chamber. The firing tubes extend from the steam chamber with their closed ends being remote therefrom. The water tubes extend similarly from the water chamber, are contained or nested within the firing tubes, and terminate within the firing tubes adjacent to the closed ends thereof. Suitable means are provided for heating the firing tubes. The proportioning and assembling of each pair of firing and water tubes are such that, after the steam generator is in normal operation, the supply of water through the water tubes to the firing tubes is at such a rate that the heat applied to the firing tubes translates all the water therein into steam prior to delivering the steam to the steam chamber.

The primary requisites for a steam generator in many, if not most, cases is economy of operation, manufacture and installation, and compactness of size. Air conditioning installations, power units for boats and the like are two specific examples that necessitate such requirements. The present invention has for an object the provision of a self-contained unit which meets these requirements. The relative proportioning and design of the firing tubes and the water tubes respectively enclosed therein are such that, after normal operation of the generator is attained, the supply of water from the water chamber through the water tubes to the firing tubes is at a rate whereby the heat to which the firing tubes are subjected translates all the water delivered to the firing tubes into steam prior to the reception of the generated steam into the steam chamber. In other words, the firing tubes serve as liberating surfaces of steam rather than merely as heat transfer surfaces for heating water, and the water tubes supply water to the firing tubes at such a rate that, under the heat conditions affecting the firing tubes, the water therein is translated very quickly into steam so that steam only is delivered to the steam chamber.

For accomplishing the control of the flow of water through the firing tubes, various constructions may be employed, several of which will be treated with specifically herein for purposes of illustration. The type of construction employed will depend largely upon the requirements of the installation. For example, where the load on the steam generator is substantially constant, one type of construction may be employed, and where flexibility of the capacity of the steam generator is required, another type of construction may be employed.

In connection with an absorption type of refrigerating system, the load on the steam generator is substantially constant. For instance, in regard to each pair of nested firing and water tubes, a fixed orifice in the water tube may be provided to permit the delivery of a predetermined supply of water from the water chamber to the firing tube, this supply being so controlled, under the quantity of heat units being supplied to the firing tube, that all the water is translated into steam whereby steam only flows from the firing tube into the steam chamber. In lieu of a fixed orifice being supplied to the water tube so that water tubes of the same size may be used throughout, the fixed orifice for each water tube being so selected that for the particular location of the water tube in the generator all of the water delivered by the said water tube to the associated firing tube is transformed into steam within the firing tube, the water tubes may have different diameters to accomplish the same purpose as that accomplished by using the fixed orifices.

In other instances where flexibility of capacity of the steam generator is required a variable orifice or outlet may be provided in the water tube. For example, the firing tube and the water tube of each nested pair of tubes may be made of different kinds of metal in order to utilize the different rates of expansion of the metals to control adjustably the supply of water to the firing tube. Thus, as the firing tube becomes hotter it would expand longitudinally at a greater rate than the associated water tube, which latter remains substantially constant during normal operation of the heater, and the space between the outer end of the water tube and the firing tube would increase to permit a greater supply of water to the firing tube as the temperature of the fire increases.

One of the objects of this invention is to provide a heater of the character indicated above wherein a steam generator is provided as a self-contained unit of relatively small size capable of economical manufacture, installation and efficient use.

Another object of this invention is to provide a heater of the type above noted in which the firing tubes thereof act specifically as steam liberating surfaces rather than as heat transfer surfaces for heating water.

Other objects and advantages will hereinafter be more particularly pointed out, and for a more complete understanding of the characteristic features of this invention reference may be had to the accompanying description when read together with the accompanying drawings, in which latter:

Figure 1 is a top plan view of one form of this invention, with parts broken away, and partly shown in section, and with the dome removed;

Fig. 2 is a view in side elevation of Figure 1 with parts broken away and partly shown in section, with the dome in place;

Fig. 3 is an enlarged detail fragmentary top plan view of the generator head with the heater tubes extending therefrom and broken away;

Fig. 4 is an enlarged detail view, partly in section and partly in elevation, taken on the line 4—4 of Fig. 2, looking in the direction of the arrows;

Fig. 5 is a view in section taken on the line 5—5 of Fig. 4, looking in the direction of the arrows, with parts of the heater tubes broken away;

Fig. 6 is a top plan view of another form of my steam generator, the top of the casing being removed together with the steam dome;

Fig. 7 is a view partially in elevation and partially in section taken on the line 7—7 of Fig. 6;

Fig. 8 is a vertical sectional view, partially in elevation, taken on the line 8—8 of Fig. 7 and showing in addition the control mechanism for the gas burners that supply the heat to my steam generator;

Fig. 9 is an enlarged detail sectional view, with portions thereof broken away, of several pairs of nested firing and water tubes associated with the generator header wherein are housed the water chamber and the steam chamber;

Fig. 10 is an enlarged sectional view of an end portion of a water tube and its associated firing tube showing the connection of the water tube to the inner wall of the water chamber housed in the generator header;

Fig. 11 is a plan sectional view, taken on the line 11—11 of Fig. 12, showing a portion of the interior of the dome that surmounts the steam and water chamber;

Fig. 12 is a view partially in elevation and partially in section taken on the line 12—12 of Fig. 11 and showing in detail the construction of the dome;

Fig. 13 is a side elevational view of the heater shown in Figs. 6, 7 and 8;

Fig. 14 is an enlarged detailed sectional view of the associated water and firing tubes in their relation to the generator head, the latter being shown in section and being of the form shown in Figs. 1 to 5, inclusive;

Fig. 15 is a top plan view of still another form of my steam generator, the casing being removed and a fragmentary portion of the generator head thereof being shown in section;

Fig. 16 is a side elevational view of Fig. 15 showing a portion thereof in section and the gas burner assembly associated therewith fragmentarily;

Fig. 17 is an end elevational view of the generator head and associated tubes of Fig. 16, the drum and end plate together with the gas burner assembly being removed therefrom;

Fig. 18 is a vertical sectional view taken on the line 18—18 of Fig. 16, the casing being shown in position in connection therewith;

Fig. 19 is a central vertical sectional view of a low water level control and associated valve controlled thereby for regulating the supply of fuel to the fuel burners, the connections therebetween being shown diagrammatically;

Fig. 20 is an enlarged detailed fragmentary sectional view taken on the line 20—20 of Fig. 18;

Fig. 21 is an enlarged detailed fragmentary sectional view taken on the line 21—21 of Fig. 18; and Fig. 22 is an enlarged detailed fragmentary sectional view taken on the line 22—22 of Fig. 18.

In the embodiment illustrated in Figs. 1 to 5, inclusive, of the drawings, the steam generator is preferably enclosed in a rectangular casing 1 provided with spaced-apart walls 2 with the space between the inner and outer walls provided with insulating material 3. The generator head is preferably a cast rectangular metal shell 4 of considerably less depth than height, supported on legs 5 adjacent one side of the casing 1. The shell 4 is provided with an outstanding flange 6 about its open end at the top and, as shown in Fig. 2, this flange preferably rests upon the top of the casing 1.

As shown in Figure 5, the interior of the shell 4 of the generator head is provided with a partition 7 spaced apart from the wall facing the interior of the casing 1. The partition is preferably formed integral with the bottom and ends of the shell and extends upwardly to terminate in line with the flanged top, the shell being divided into compartments 8 and 9. It is preferable to support the partition by a plurality of stay rods 10 formed integrally with the partition and the most distant wall of the shell, as shown in Figure 5.

The face 11 of the generator head is perforated to support a plurality of spaced-apart tubes 12 which are arranged in parallel horizontal rows with the tubes in staggered relation, as shown in Figure 4. These tubes 12 are arranged to extend across the space within the casing 1 and their outer or free ends are closed by plugs 13. It is preferable to support the free ends of the tubes 12 in a perforated plate or other support 14 mounted on feet 15 within the casing 1. The partition 7 is provided with a plurality of perforations concentric with the tubes 12 to support therein a plurality of tubes 16 spaced apart from the inner walls of the tubes 12 and these tubes 16 terminate in a spaced-apart relation to the plugs 13. It is, therefore, seen that the inner tubes 16 are in communication with the wider space 8 between the partition 7 and the outer shell of the generator while the outer tubes 12 are in communication with the smaller space 9 between the partition 7 and the most adjacent wall of the shell of the generator. When water is introduced into the wider or water compartment through the inlet 17 arranged in the bottom thereof, the water will flow from the water compartment 8 through the smaller tubes 16 into the surrounding tubes 12 and into the smaller space 9 between the partition and the more adjacent wall until the level is the same in both compartments.

The steam generator illustrated herein is preferably gas-fired by a plurality of gas burners 18 connected by pipe 19 leading through the spaced-apart walls 2 of the casing 1 to a gas manifold inlet 20. The burners are preferably of elongated rectangular conformation and, as shown, extend at right angles to the tubes 12, the bottom rows of which are spaced apart from the top of the burner sufficiently to form a combustion space and the gases of combustion pass between the staggered rows of tubes to the top of the casing 1 and then pass out through a preferably centrally located outlet 21. It is preferable to provide a horizontal row of tubes 22 with or without the enclosed tubes 16 below the burners 18 and also provide a single vertical row 23 of similar tubes between the far end of the casing and the burner as shown in Figure 4. An aperture with a cover 24 is provided in the wall of the casing adjacent the manifold 20 for the insertion and removal of the burners 18 and it is preferable to arranged a vertical row 25 of tubes similar to those of row 22 adjacent the wall 2 but to omit one of the tubes in order to allow the burner 18 to be passed therethrough.

It is preferable to provide the upper open end of the generator head with a dome 25a having an outwardly extending flange 26 adapted to be bolted to the flange 6 of the generator head. The dome is provided with a steam pipe 27 leading to its place of work. It is preferable to provide an angular baffle 28 within the dome 25a extending downwardly at an angle over the opening in the generator head leading from the smaller compartment 9, for a purpose hereinafter described.

To initiate operation of this improved steam generator after the feed water has been admitted into the water compartment 8 and has flowed through the tubes 16 and 12 into compartment 9 until the water level in both compartments is approximately alined with the bottom of the top row of tubes 12, the burners 18 are ignited. The heat created within the combustion space below the lower horizontal row of tubes 12 and the hot gases of combustion passing upwardly through the other horizontal rows of staggered tubes 12 quickly increase the temperature of water contained in these tubes which surrounds the smaller contained tubes 16 to the boiling point to fill the tubes 12 with steam which passes into the smaller chamber 9, hereinafter referred to as the steam chamber. As the steam passes out of the tubes 12 into the steam chamber 9, it preheats the water in the tubes 16 as it passes therethrough from the water compartment or chamber 8 into the closed end of the tubes 16 wherein it is converted into steam. The steam from tubes 12 passes upward through the water in the steam chamber 9 on its way to the dome 25a, when operation is initiated, and carries over with it particles of the water and the level of the water in the steam chamber 9 descends. The water carried over with the steam impinges upon the baffle 28 in the dome and is returned to the water chamber 8 and the condensate collecting upon the inner walls of the dome 25a as well as the condensate returned from the steam outlet pipe 27 is returned by gravity to the water chamber 8, setting up a circulation of water.

Continuous operation in the above manner after initiation of burner operation causes a change of level of the water in the steam and water chambers and, as above stated, the water in the steam chamber descends. After the water accumulated in the steam chamber and the firing tubes has been evacuated into the water chamber the normal operation of the generator ensues. The proportioning and assembling of each pair of firing and water tubes are such that after the steam generator is in normal operation the supply of water through the water tubes to the firing tubes is at such a rate that the heat applied to the firing tubes translates all the water therein into steam prior to delivering the steam to the steam chamber.

The proportioning and assembling of each pair of firing and water tubes to accomplish the above purpose has been stated generally above. In the embodiment illustrated in Figures 1 to 5, inclusive, the firing and water tubes of each nested pair of tubes are made of different kinds of metal in order to utilize the different rates of expansion of the metals to control adjustably the supply of water to the firing tubes. Referring more particularly to Figures 5 and 14 of the drawings, it will be apparent that as the firing tube 12 becomes hotter it would expand longitudinally at a greater rate than the associated water tube 16, which latter remains substantially constant during normal heater operation due to the temperature of the steam remaining substantially constant, and the space between the outer end of the water tube 16 and the end of the firing tube 12 would increase to permit a greater supply of water to the firing tube as the temperature of the hot gases of combustion increases. The regulation of the flow of water in the above manner has the additional advantage of preventing the firing tubes from burning out. It is also apparent that the associated tubes of the lowermost row adjacent the burners 18 would contact the hotter gases of combustion and that the relative expansion of the tubes of different superposed rows would vary in accordance with the variation in the delivery of heat thereto in order that the supply of water through the water tubes to the firing tubes is translated into steam prior to the delivery of the steam to the steam chamber.

By this above construction, dry or superheated steam is readily and quickly supplied by a very compact and easy-to-construct steam generator. The foregoing Figures 1 to 5, inclusive, and the description of the apparatus therein shown are embodied in my copending application Serial No. 263,821.

Referring now more particularly to Figures 6 to 13 of the drawings, the steam generator therein disclosed preferably comprises an insulated casing 30 of substantially rectangular cross section, the insulation 30' extending preferably on all sides as well as the top and bottom of the casing. A generator head 31 is housed within the casing and preferably comprises a cast substantially rectangular metal shell supported on lugs 32 adjacent one end of the casing 30. The shell is provided with an outstanding peripheral flange 33 about the open upper end thereof, this flange having its upper surface substantially in alinement with the top wall of the casing 30.

The generator head 31 is divided by means of a partition 34 into a water chamber W and a steam chamber S. The partition 34 is preferably formed integrally with the bottom and ends of the shell and its upper surface terminates in alinement with the upper surface of the flange 33. The partition 34 is closer to one side wall of the header than to the other, thus providing a water chamber of substantially greater volume than that of the steam chamber.

The inner side wall S' of the generator head which forms the inner wall of the steam chamber S is provided with a plurality of rows of threaded openings to receive and to support a plurality of firing tubes 35, with the firing tubes extending horizontally from the steam chamber S for communication therewith and the extended ends of the firing tubes being closed with plugs 35' (Fig. 9) or other removable means so that access may be had to these tubes for cleaning. In order to secure more efficient heat transfer to the surfaces of the firing tubes 35, the openings in the side wall S' of the header, and thus the extending firing tubes 35, are arranged in parallel horizontal rows in a staggered vertical relationship, as shown more particularly in Fig. 8.

The partition 34 is provided similarly with a plurality of openings concentric with the firing tubes 35 to support in each opening a water tube 36. The water tubes are open ended and in communication at one of their ends with the water chamber W, the tubes extending within the firing tubes and terminating adjacent to the closed ends thereof, as shown more particularly in Fig. 9. The water tubes 36 are in communication with the chamber W which is of relatively greater volume between the partition 34 and the outer wall of the generator head 31 and the firing tubes 35 are in communication with the chamber S which is of relatively smaller volume.

In the initial firing of the heater, water is introduced into the chamber W through the inlet 37, at the bottom of the header, and the water will flow from the water chamber W through the smaller water tubes 36 into the firing tubes 35, and thereafter into the chamber S until the level of the water is the same in both chambers W and S. As will be hereinafter pointed out, the water levels in these two chambers will change during the operation of the heater, the water level in the chamber W being indicated generally by the broken line L and the water level in the chamber S by the broken line L' which is below the level of the firing tubes. These two levels indicated by the lines L and L' are merely representative that a change in the water levels occurs from their normal initial position after the steam generator is put into operation.

The heater may be gas fired by a plurality of transversely extending gas burners 38, each being connected by a pipe 39 (Figs. 8 and 13) leading through one wall of the casing 30 to a gas manifold 40. The burners are preferably of elongated form and, as above stated, extend transversely of the longitudinally extending firing and water tubes. The burners are arranged below the bottom row of the main bank of firing and water tubes, although it is preferable that at least a row of tubes, that may or may not constitute water tubes nested in the firing tubes, be disposed on each side of and below the burners for purposes of more complete insulation of heat escaping from the burners. The products of combustion from the gas burners pass upwardly between the staggered rows of firing tubes to the top of the casing and escape through a conduit 41. Access may be had to the individual burners at a point adjacent the manifold 40 through a removable wall 42 secured to the casing 30, as by means of screws or the like.

The tubes 35 and 36 may be supported in the heater in a manner more particularly illustrated in Figs. 9 and 10. Relatively short annular body portions 43 are provided with external threads for engaging them in apertures in the partition 34. Each body portion 43 is provided with a plurality of longitudinal and spaced passages 44 which provide communication between the steam chamber S and the water chamber W. A skirt 45, formed on the body portion 43 and having preferably the diameter of the firing tube 35, surrounds the water tube 36 in spaced relation thereto and this skirt is provided with a plurality of peripherally disposed, transverse apertures 46 which extend into the steam chamber S. The water tube 36 is preferably reduced to project through an axial aperture in the body portion 43 for fixed engagement therewith, the forward extending end of the water tube being provided with a cap 47 having a restricted orifice 48 disposed therein coaxially with the water tube 36.

A disc 49 slidingly engages the water tube 36, the disc being limited in its movement in one direction by the cap 47 and in the other direction by the face of the body portion 43 that projects into the water chamber W. The disc 49 normally occupies a position in contact with this face of the body portion 43 to seal the passages 44 between the water chamber W and the steam chamber S, the pressure of the water in the chamber W normally holding the disc 49 in this position. However, the disc 49 may be forced away from its sealed engagement with the body portion 43 and the disc thereby acts as a valve for purposes which will hereinafter be more clearly pointed out.

A steam dome 50 is arranged above and in communication with the water and steam chambers S and W, as shown in Figs. 7 and 12. The steam dome comprises a closed two-part housing in the form of two metal castings 51 and 52, the castings having outwardly extending peripheral flanges 53 and 54, respectively, secured together by means of bolts 55 and nuts 56. A suitable gasket 57 is disposed between the flanges for purposes of sealing the connection therebetween. One end of conduit 58 is secured in an opening in the lower end of the steam dome 50, the other end being secured in an aperture in a plate 59, which latter is bolted or otherwise secured to the flange 33 extending outwardly from the upper end of the generator head 31. A second conduit 60 is secured in a second aperture in the plate 59 and extends upwardly therefrom through an aperture in the lower portion of the steam dome 50, the upper end of the conduit 60 extending a substantial distance into the steam dome to receive on the end thereof a stationary impeller 61. The stationary impeller 61 has radially outwardly extending curved fins 62 for purposes which will be hereinafter more particularly pointed out.

A disc 63 is disposed in the dome 50 to divide it into upper and lower communicating compartments 64 and 65. The disc 63 is disposed immediately adjacent the upper face of the stationary impeller 61, the diameters of the disc 63 and the stationary impeller 61 being substantially less than the diameter of the inside wall of the dome. A baffle 66 is secured to the inside wall of the dome and extends radially inwardly to terminate in a spaced relation from the edge of the disc 63 to provide a steam passage 67 therebetween. The disc 63 is provided with a plurality of spaced tapered slots 68 extending from the upper surface thereof in a direction downwardly and radially outwardly beyond the peripheral edge of the stationary impeller 61. An open-ended water lift tube 69 is disposed in axial relation to the aperture of the disc 63 and extends downwardly therefrom into the steam chamber S to a plane below the firing tubes 35.

To initiate operation of the heater just described, after the feed water has been admitted into the water chamber W and until the water level in both the steam and water chambers of the generator head is alined approximately with the top row of water tubes 36, the gas burners 38 are ignited. The heat created within the combustion space below the lower horizontal rows of firing tubes 35 and the hot gases of combustion passing upwardly between the superposed horizontal rows of vertically staggered firing tubes 35, quickly increase the temperature of the water contained in the water tubes, the water changing into steam as it passes into and through the firing tubes into the steam chamber. As the steam forms and passes from the firing tubes 35 into the steam chamber S, it preheats the water passing through the water tubes 36 from the water chamber W.

The steam from the steam chamber rises upwardly through the conduit 60 and thereafter is directed radially outwardly by the steam impeller 61 and the co-operating disc 63. The particular arrangement and curvature of the fins 62 give the steam a swirling motion, directing it against the inner wall of the steam dome to throw out any particles of water that are mechanically entrained in the steam, the dry steam then rising through the passage 67 into the upper compartment 64 of the steam dome for delivery to the work.

Steam directed radially outwardly by the cooperating steam impeller 61 and disc 63 passes over the ends of the apertures 68 and the velocity of the steam creates an aspirating effect to produce a reduced pressure in a chamber C formed by the disc 63 and an inverted cup-shaped member 70. The reduction in pressure in the chamber C lifts the water in tube 69 upwardly to spill out over the top surface of the disc 63 into the chamber C. The water passes from the chamber C through the inclined apertures 68 into the bottom of the lower compartment 65 of the steam dome 50 and thence back into the water compartment W through the conduit 58. The water in the steam chamber thus drops from an initial level equal to that in the water chamber to the level indicated by the reference character L', the latter level being below the level of the firing tubes.

After the levels L and L' in the water and steam chambers, respectively, have been attained during a continued operation of the heater and the steam generator is in normal operation, a continuous cycle of operation is maintained under the same conditions, the water being fed through the orifices 48 from the water chamber to the water tubes at such a rate that the heat supplied to the firing tubes will translate all the water into steam prior to the reception thereof into the steam chamber S for supply to the steam dome. The size of each of the orifices 48 is predetermined by a fixed boiler capacity and a definite heating rate. The size of the aperture 48 may be varied by substituting a cap of one size orifice for that of a cap having an orifice of another size.

In an absorption refrigerating system, for example, the load on the steam generator is fixed and flexibility is not required. In this condition a fixed orifice for each water tube is desirable and suitable for use. The size of the fixed orifice for each row of tubes varies, however, because of the variation in the supply of heat thereto. It is apparent, as has been recited hereinbefore, that the hottest gases of combustion contact the lowermost row of associated water and firing tubes and that the temperature of the hot gases decreases as they pass upwardly between the vertically staggered rows of tubes. The sizes of the orifices 48 of the caps vary in accordance with the variation of heat delivered to the firing tubes in order that the supply of water through the water tubes to the firing tubes is at such a rate as to transform all the water into steam within the firing tubes prior to delivery into the steam chamber.

It is desirable in generators of the type herein disclosed that the steam chamber be kept dry or that no accumulation of water be permitted in the steam chamber at or above the level of the lower row of firing tubes. The provision of orifices in the ends of the water tubes in which the sizes of the orifices in the different rows vary in accordance with the different quantities of heat delivered to the firing tubes of corresponding rows prevents the accumulation of water in the steam chamber since the supply of water through the water tubes to the firing tubes is fixed at a rate such as will translate the water into steam in the firing tubes prior to delivery therefrom into the steam generator. Where the sizes of the orifices are fixed with respect to each row of water tubes so that there is no variation in the sizes of the orifices in accordance with the different quantities of heat delivered to the firing tubes, it becomes necessary, or at least desirable, to prevent the accumulation of water in the steam chamber by some equivalent means.

The orifices in the lowermost rows of vertically staggered horizontal rows of tubes may be of such a size as will permit the supply of water through the water tubes to the firing tubes at such a rate as to be translated into steam prior to delivery thereof into the steam chamber, but an over supply of water may be delivered in the upper rows of firing tubes should the associated water tubes have the same size orifices as those in the water tubes associated with the lower rows of firing tubes, because of the fact that the temperature of the hot gases decreases as they pass upwardly between the rows of tubes. The steam developed in the upper rows of firing tubes, therefore, may have mechanically entrained particles of water which are carried thereby. As the steam leaves these firing tubes and passes into the steam chamber, the water entrained therein flows at a high velocity and in a substantially straight line through the apertures 44 while the dry steam flows upwardly in the steam chamber, the impact of the entrained water forcing the valve 49 against the head of water in the water chamber. Thus this entrained water accumulates in the water chamber. Consequently the valve construction shown in Fig. 10 is desirable where the orifices 48 in the water tubes are of the same size in each of the superposed rows of tubes so as to permit water particles entrained in the steam to become trapped in the water chamber as the steam flows into the steam chamber and escapes therefrom.

In Fig. 13 a gas burner control system is generally shown. The gas burner controls consist generally of an adjustable gas pressure regulating valve 71, a modulating valve 72, and a pressure regulator and low water cut-off control 75. The modulating valve 72 regulates the flow of gas to the burners to maintain a predetermined steam pressure in the steam generator. Gas is supplied to the manifold 40 from a source of gas supply through the pipe 74 to the pressure regulating valve 71 from whence it passes to the modulating valve 72. Gas from the modulating valve 72 passes through a manually controlled valve 76 and a pipe 77 to the manifold 40. The modulating valve 72 operated by the control 75 shuts off the gas completely after the steam pressure exceeds a predetermined limit or during a low water condition of the water chamber W. This modulating valve 72 also acts to shut off the gas supply in case of failure of the pilot lights 78 indicated in Fig. 8. These various valves and system for supplying and controlling the gas supplied to the burners 38 have not been shown structurally in detail since they form no part of this invention and are illustrated and described merely for the purpose of disclosing a complete and operative structure.

Referring now more particularly to Figs. 15 to 22, inclusive, of the drawings, my steam generator in its preferred form is there shown. It is enclosed in a rectangular casing 79 provided with insulation 80 on the inner sides of the top, side and end walls. The steam generator is preferably comprised of an end casting 81 forming a generator head and an end plate 82 spaced therefrom for supporting a steam drum 83 therebetween. The steam drum is flanged at its open end at 85 and is closed at the other end by means of a plate 84. The flange 85 is bolted or otherwise secured to a flange 86 of the generator head 81.

A plurality of rows of firing tubes 87 are supported by and between the generator head 81 and the end plate 82. The rectangular casing 79 is provided with horizontally extending end plates 88, one at each end for supporting respectively the generator head casting 81 and end plate 82 in a spaced relation from the bottom of the casing, the space providing a chamber 89 for housing the burner assembly. Suitable air vents 90 are disposed in the side walls of the casing 79 for permitting air for combustion to enter into the chamber 89.

The generator head 81 is divided by a partition 91 into a water chamber 92 and a steam chamber 93, the partition extending from the bottom of the generator head to a plane substantially centrally of the steam drum 83. A side wall 94 (Figs. 20, 21 and 22) of the generator head 81 is provided with a plurality of horizontally extending rows of threaded openings to receive and to support in each one end of a firing tube 87, the other ends of the firing tubes being received in correspondingly spaced openings arranged in horizontally extending rows in the end plate 82. The firing tubes 87 are in open communication with the steam chamber 93 of the generator head 81 and the extended or remote ends of the firing tubes are closed with suitable plugs which are detachably or permanently fixed therein. The firing tubes 87 are disposed in parallel horizontal rows in a staggered vertical relationship for effecting an efficient heat transfer to the surfaces thereof.

The partition 91 is provided with a plurality of openings which are arranged concentrically with the openings in the wall 94 to support in each a water tube 95. The apertures in the partition 91 are internally threaded to engage external threads on the ends of the water tubes and the water tubes are open-ended and in open communication with the water chamber 92. The water tubes extend within the firing tubes 87 and terminate adjacent to but spaced from the closed or plugged ends thereof, as shown in Fig. 14, to provide a passage for permitting the flow of water from the water tubes to the firing tubes.

As in the previously described embodiments, the steam generator is heated by gas burners although, of course, it is to be understood that any heating means may be substituted for gas burners as may be desired. In the drawings, a plurality of gas burners 96 are disposed in the chamber 89 to extend upwardly therefrom into the lower portion of a combustion chamber 97. The combustion chamber is provided at each side thereof with a plurality of firing and water tubes forming water legs 98, the water legs being for the purpose of insulation.

The horizontally extending rows of firing and water tubes are above the combustion chamber 97 and are of such a number and of such size that the supply of water through the water tubes to the firing tubes is at a rate that the heat supplied to the firing tubes translates all the water into steam prior to the delivery of the steam into the steam chamber. In the generator shown in Figs. 16, 17 and 18, there are nine horizontally extending rows of associated or paired firing and water tubes with eleven pairs of tubes in each row. For the purpose of illustration the grate area is approximately 4.7 square feet and the burners have an input of 1,250,000 B. t. u. per hour with a boiler output of 1,000,000 B. t. u. per hour. Each of the firing tubes is 1¼" outside diameter, or 1" inside diameter, the tubes being 34" long. The ninety-nine firing tubes have a heating surface, therefore, of approximately ninety-two square feet. Inasmuch as the firing tubes are spaced $1\frac{9}{16}$" from center to center, the overall height of the bank of tubes is approximately 14".

Since heat is extracted from the products of combustion rising from the combustion chamber 97 gradually as it passes over and between the firing tubes in a direction upwardly from the combustion chamber, the temperature of the hot gases at the top of the bank of tubes will be less than the hot gases at the bottom thereof immediately adjacent the combustion chamber. In order that the supply of water through the water tubes to the firing tubes is at such a rate that the heat supplied to the firing tubes translates all the water to steam prior to the delivery of the steam into the steam chamber, there must be a lesser supply of water to the firing tubes of the upper rows than that water supplied to the firing tubes of the lower rows. In order to regulate the supply of water to the firing tubes, the water tubes are provided with orifices of different diameters. The top two rows of water tubes, one tube of which is illustrated fragmentarily in Fig. 20, are provided with orifices $\frac{5}{32}$" in diameter in ⅛" iron pipes; the next two lower water tubes, one tube of which is illustrated fragmentarily in Fig. 21, are supplied with orifices $\frac{3}{16}$" in diameter in ⅛" iron pipes, and the next lower tubes, one tube of which is illustrated fragmentarily in Fig. 22 of the drawings, are provided with $\frac{3}{32}$" orifices in ⅛" iron pipes, The bottom three rows are provided with ³⁄₁₆″ orifices in ¼″ iron pipes.

Referring more particularly to Figs. 20, 21 and 22 of the drawings, it will be noted that the normal opening of the water tubes may be varied by the provision of an orificed bushing 99 in the forward end of the water tubes 95, the orifice thus provided for being of a predetermined size. While the water tubes 95 may be of uniform diameter, it being noted that but two sizes of water tubes are disclosed in the drawings, yet each row may be provided at the ends thereof with different sized bushings to vary the orifices in such a manner as will permit the flow of the water from the water tubes to the firing tubes at such a rate that all the water will be transformed into steam prior to the delivery of the steam into the steam chamber. Accordingly, the supply of water through each horizontal row of water tubes is varied in accordance with the variation in temperature of the hot gases passing upwardly from the combustion chamber so that all of the water fed from the water tubes to the firing tubes will be translated into steam prior to the delivery thereof into the steam chamber. The firing tubes in the capacity above stated serve as liberating surfaces of steam rather than merely as heat transfer surfaces for heating water.

In conventional boilers the water level is maintained above the heating surface and it is necessary to provide sufficient liberating surface at this water level to permit the steam to escape without violent agitation of the water in the boiler. A primary purpose of this invention is to so proportion the heating surface and the rate of flow to which the water is fed to the heating surface that all the water is translated into steam in each firing tube and liberated directly on the heating surface thereby providing essentially dry or superheated steam to be delivered to the steam chamber of the generator head. It is readily seen that if the firing tubes were completely filled with water it would be necessary for the steam to be liberated at the water level above the firing tubes and sufficient area of the steam liberating surface provided to eliminate violent agitation which would make it necessary to increase the proportions of the steam generator.

The water chamber 92 is in open communication with the steam drum 83 above the partition 91 and through a passage 100 formed as a part of the generator head, this passage extending across and closed to the steam chamber. The steam chamber 93 is also in open communication with the steam drum 83 above the top of the partition 91. In the initial firing of the steam generator water is introduced into the generator head and fills both the steam and the water chambers as well as the water and firing tubes. The initial water level merely may be such as to have all of the water tubes submerged. When the temperature of the water increases to the point where steam is formed, the steam will displace the water and the water will accumulate at a higher level in the water chamber and in the bottom of the steam drum 83 until the firing tubes and the steam chamber are cleared of water. Thereafter the amount of water fed from the water tubes to the firing tubes will be just sufficient to translate all of the water into steam prior to the delivery of steam into the steam chamber.

The low water level in the water chamber is controlled so that at all times sufficient water will be in the water tubes for successful operation of the steam generator. Should the water level decrease to an extent that all of the water tubes are not supplied with water, then the system is closed down by a low water level control switch which is shown more particularly in Fig. 19 of the drawings and to which attention is now directed.

A housing 101 is provided with a threaded extension 102 for threaded engagement with an internally threaded aperture 103 in the side wall of the generator head 81 in order that the housing may have open communication with the water chamber 92 (Fig. 16). A float 104 is disposed in the water chamber 92 and is secured to one end of an arm 105, the other end of which arm is pivotally mounted on a projection 106 extending from the inner wall of the housing 101. The housing 101 is provided with a cover 107 for housing a tiltable mercury tube switch 108, the switch 108 being actuated into open and closed circuit positions by means of a pin 109 which extends through a sealing bellows 110 and is fastened to the arm 105 for movement therewith.

When the level of water in the water chamber 92 is at a normal height, the float 104 maintains the tiltable switch 108 in a circuit energizing position whereby an electro-magnetically controlled valve 111 permits the flow of gas from a conduit 112 leading from a source of supply through a conduit 113 leading to the burners 96. When the water level in the water chamber 92 drops below a desired level the float 104 drops, thereby causing the tilting of the mercury tube switch 108 to a second position to de-energize the circuit through the electromagnet 114. A valve 115 operated by the electromagnet 114 is thus closed, falling by force of gravity to stop the flow of gas from the source of supply to the burner which, of course, discontinues the supply of heat to the steam generator.

Referring now more particularly to Figs. 15 and 18 of the drawings, the steam drum 83 is shown as being of comparatively substantial size for the purpose of providing a reservoir for maintaining an accumulation of steam and an accumulation of water. In the initial firing of the steam generator, water having been introduced into the water and steam chambers to fill the firing and water tubes, steam formed in the firing tubes passes into the upper portion of the steam drum and from thence through an opening 116 at the upper end thereof to be used as desired. The steam returns to the drum 83 as condensate through an opening 117 adjacent the bottom of the drum and accumulates therein. Gradually as all of the water in the firing tubes is translated into steam and passes out of the steam drum for its desired use, the entire accumulation of the water in the firing tubes is transferred to the steam drum in the form of condensate return, the condensate returning to the steam drum faster than the water is supplied through the orifices into the water tubes, until the steam generator reaches its maximum efficiency when the condensate return and the water delivered to the water tubes are equalized. If steam escapes from the system, then the water chamber of the generator will have to be replenished to compensate for the loss due to the escape of steam. Any suitable means could be supplied for replenishing the water.

In addition to the restriction of the amount of water fed to the firing tubes through the orifices of the water tubes the frictional resistance of the steam flowing in the firing tubes will cause the water level in the water chamber to rise to a point whereat a sufficient water head or pressure will be attained to cause the flow of water through the orifices of the water tubes and into the firing tubes to balance the amount of steam being generated and leaving the steam outlet 116.

As heat is supplied to the firing tubes, steam will be generated therein, creating a frictional resistance as the steam flows through the firing tube and enters the steam chamber. This, in turn, causes the water in the water chamber to rise and provide a pressure head that will correspond to the frictional resistance set up in the firing tubes by the flow of the steam.

Since the frictional resistance of the flowing steam in each tube is in direct proportion to the amount of steam being generated, and since the temperature gradient of the products of combustion for each succeeding row above the bottom row of tubes is not in exact proportion to the reduction in head in the water chamber for each progressive row upward, means have been described above for restricting proportionately the flow of water in each row of water tubes in accordance with the above mentioned factors so as to translate all water delivered into each firing tube into dry steam prior to delivery thereof into the steam chamber.

As has hereinabove been recited, the proportioning of the flow of water from the water tubes to the firing tubes can be provided by correspondingly changing the sizes of the water tubes, or by supplying bushings having various sized orifices in water tubes of the same size. The sizes of the firing tubes, or the sizes of the orifices in the orificed bushings in water tubes of the same size, not only depend upon the heat available from the products of combustion but upon the head of water in the water chamber, the latter being dependent in part upon the frictional resistance created by the steam escaping from the firing tubes. From the above it can readily be seen that in order to translate all of the water fed to each firing tube into steam within the firing tube, some means must be employed to restrict the flow of water to each firing tube, the factors determining the amount of the restriction being dependent upon the amount of heat available at each horizontal row of paired tubes, the water head in the water chamber, and the frictional resistance created by the steam leaving the firing tubes.

In proportion to the number and to the diameter and length of the paired tubes hereinabove given in the specific example, the steam drum is of substantially the same length as the tubes and approximately 14" in diameter, or of a volume at least double that of the effective volume of the firing tubes. As above pointed out the amount of heating surface is ninety-two square feet. All of this heating surface is actually steam liberating surface as distinguished from prior designs wherein the steam is actually liberated at the water level. It is quite apparent that in view of the difference in the functioning of the firing tubes in their action of liberating steam as water is fed thereto, the size of the steam generator is maintained within very small dimensions compared to the size of the conventional heater. In order to gain an idea of the compactness of the construction of the present invention, the overall dimensions of the casing are, height 52", depth 45", and width 27".

While several embodiments of this invention are herein shown and described, it is to be understood that various modifications thereof will be apparent to those skilled in the art without departing from the spirit and scope of this invention and, therefore, the same is only to be limited by the scope of the prior art and the appended claims.

I claim:

1. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom through said steam chamber to within said firing tubes for termination adjacent to but spaced from the closed ends thereof, means for heating said tubes, and means associated with said water tubes for proportioning the supply of water delivered thereby to said firing tubes at such a rate that the heat supplied to said firing tubes will translate substantially all the water into steam prior to the reception thereof into said steam chamber.

2. A steam generator comprising a casing, a generator head within said casing divided into a water chamber and a steam chamber, a plurality of rows of firing tubes in open communication with said steam chamber, said firing tubes extending from said steam chamber into said casing with the remote ends of the firing tubes being closed, a plurality of open-ended water tubes of lesser diameter in open communication with said water chamber and extending through said steam chamber and being nested within said firing tubes for termination adjacent to but spaced from the closed ends thereof, means for heating said tubes housed in said casing, and means for controlling the supply of water delivered to said firing tubes through said water tubes at such a rate that the heat supplied to said firing tubes by said heating means will translate substantially all the water contained therein into steam prior to the reception of the steam in said steam chamber, said steam chamber having one wall which lies adjacent said heating means which is heated directly thereby.

3. A steam generator comprising a casing, a generator head within said casing divided into a water chamber and a steam chamber, a plurality of superposed rows of firing tubes in open communication with said steam chamber, said firing tubes extending from one wall of said steam chamber into said casing with the remote ends of said firing tubes being closed, a plurality of open-ended water tubes of lesser diameter in open communication with said water chamber and extending through said steam chamber and being nested within said firing tubes for termination adjacent to but spaced from the closed ends thereof, means housed in said casing below said superposed rows of tubes for the heating thereof, and means for restricting the supply of water delivered to said firing tubes through said water tubes in varying degrees upwardly from the bottom row to the top row of said tubes in accordance with the variation in the delivery of heat thereto by said heating means so that substantially all the water contained in said firing tubes will be translated into steam prior to the delivery of the steam from the firing tubes into said steam chamber, said one wall of said steam chamber being positioned adjacent said heating means whereby it is directly heated thereby.

4. A steam generator comprising a casing, a generator head within said casing, a partition dividing said generator head into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extend therefrom through said steam chamber to within said firing tubes for termination adjacent to but spaced from the closed ends thereof, a drum disposed above said tubes and in open communication with said steam and water chambers for supplying steam to a desired point of use and for receiving condensate therefrom, said partition being provided with an extension projecting through said steam chamber into said drum, said extension having a passage placing said water chamber in communication with said drum for supplying preheated water from said drum to said water chamber, and means for heating said tubes, said heating means and said tubes being housed in said casing, the proportioning of said firing and water tubes being such that the supply of water through said water tubes to said firing tubes is at such a rate that the heat supplied to said firing tubes by said heating means translates substantially all the water into steam prior to the delivery of the steam into said steam chamber.

5. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes for termination adjacent to but spaced from the closed ends thereof, means for heating said firing tubes, said firing tubes and said water tubes being formed of metals having different coefficients of expansion for controlling the supply of water through said water tubes to said firing tubes at such a rate that the heat supplied to said firing tubes will translate substantially all the water into steam prior to the reception thereof into said steam chamber.

6. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes for termination adjacent to but spaced from the closed ends thereof, means for heating said firing tubes, and means for varying the spacing of the open ends of said water tubes from the closed ends of said firing tubes in accordance with the temperature of said firing tubes for controlling the supply of water through said water tubes to said firing tubes at such a rate that the heat supplied to said firing tubes will translate substantially all the water into steam prior to the reception thereof into said steam chamber.

7. A steam generator including a casing, a generator head within the casing divided into a water chamber and a steam chamber, a plurality of horizontal rows of steam tubes closed at one end leading from the steam chamber within the casing, a plurality of water tubes leading from the water chamber and extending within the steam tubes to adjacent the closed ends thereof, a source of heat provided under the lower horizontal rows of tubes, and a dome arranged above and in communication with the generator head, a baffle in the dome above the opening of the steam chamber, whereby, when operation is initiated, the particles of water carried over with the steam from the steam tubes are separated from the steam and returned with the condensate to the water chamber.

8. A steam generator including a casing, a generator head within the casing open at the top and divided by a vertical partition into a water chamber and a steam chamber, a plurality of horizontal rows of steam tubes closed at one end leading from the steam chamber of the generator and extending into the casing, a plurality of water tubes leading from the water chamber extending within the steam tubes to adjacent the closed end thereof, a source of heat provided under the lower horizontal row of tubes, and a dome arranged above and in communication with the generator head having a baffle therein above the opening of the steam chamber, whereby, when operation is initiated, the particles of water carried over with the steam from the steam tubes are separated from the steam and returned with the condensate to the water chamber.

9. A steam generator comprising a casing, a plurality of closely adjacent horizontally disposed elongated steam-generating tubes supported in a wall vertically disposed and forming one wall of a steam-conducting chamber, said tubes being closed by plugs at their ends remote from said wall, a second wall vertically disposed in spaced parallel relation to said first-mentioned wall forming the second wall of said steam-conducting chamber, a third wall vertically disposed in spaced parallel relation to said second wall and forming together therewith a water chamber, a set of smaller elongated water-conducting tubes supported in said second wall and passing therethrough so as to be communication with said water chamber, said water-conducting tubes being open at both ends and severally extending concentrically into said steam-generating tubes, a fluid-fuel burner below said tubes and steam-conducting chamber, a dome surmounting both the steam-conducting and the water chambers, and a spray deflecting baffle mounted in said dome over said steam-conducting chamber, said plugs in said steam-generating tubes positioned substantially in alignment with said water-conducting tubes which on removal will afford access to both the sets of tubes for inspection and cleaning.

10. A steam generator comprising a generator head within said casing divided into a water chamber and a steam chamber, a plurality of rows of firing tubes in communication with said steam chamber; said firing tubes extending from said steam chamber with the extended ends thereof being closed, a plurality of open-ended water tubes in communication with said water chamber and extending therefrom within said firing tubes to terminate adjacent the closed ends thereof, means for heating said firing tubes, a steam dome arranged above and in communication with said water and steam chambers, and an open-ended water lift tube in communication with said steam dome and extending downwardly therefrom into said steam chamber to a plane below said firing tubes.

11. A steam generator comprising a generator head divided into a water chamber and a steam chamber, a plurality of rows of firing tubes in communication with said steam chamber, said firing tubes extending from said steam chamber with the extended ends thereof being closed, a plurality of open-ended water tubes in communication with said water chamber and extending therefrom and through said steam chamber to within said firing tubes for termination adjacent to but spaced from the closed ends thereof, means for heating said tubes, and means providing restricted orifices for said water tubes for proportioning the supply of water through said water tubes to said firing tubes at such a rate that the heat supplied to said firing tubes will translate substantially all the water into steam prior to the reception thereof into said steam chamber.

12. A steam generator comprising a casing, a generator head within said casing divided into a water chamber and a steam chamber, a plurality of horizontal and vertically superposed rows of firing tubes and water tubes, the latter being nested within the former to provide pairs of tubes, said firing tubes being in communication with said steam chamber and extending from one wall thereof with the extended ends of the firing tubes being closed and said water tubes being open-ended and in communication with said water chamber and extending therefrom through said steam chamber to within said firing tubes for termination adjacent to but spaced from the closed ends thereof, means within said casing and below the rows of said nested tubes for heating them, and bushings having restricted orifices disposed within said water tubes, the sizes of the restricted orifices being dependent upon the distance of each pair of nested tubes from said heating means thereby controlling the supply of water to said firing tubes in order that the heat supplied to said firing tubes will transform substantially all the water therein into steam prior to the delivery thereof into said steam chamber, said one wall of said steam chamber being positioned adjacent said heating means whereby it is directly heated thereby.

13. A steam generator comprising a casing, a generator head within said casing divided into a water chamber and a steam chamber, a plurality of horizontal and vertically disposed rows of firing and water tubes, the latter being housed within the former to provide pairs of nested tubes, said firing tubes communicating with said steam chamber and extending therefrom with the remote ends of the firing tubes being closed and said water tubes being open-ended and in communication with said water chamber and extending therefrom through said steam chamber to within said firing tubes to terminate adjacent to but spaced from the closed ends thereof, means within said casing but below said nested tubes for heating them, and bushings having restricted orifices disposed within said water tubes.

14. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes for termination adjacent to but spaced from the closed ends thereof, means for heating said tubes for supplying steam to said steam chamber, a support for each of said water tubes, said supports having passages communicating between said steam and water chambers, and valve means on said supports for controlling said passages, said valve means being operated by entrained particles of water in said steam delivered to said steam chamber.

15. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes to terminate adjacent to but spaced from the closed ends thereof, means for heating said firing tubes, a steam dome arranged above said water and steam chambers, said steam dome comprising a closed housing having an apertured disc dividing said dome into upper and lower communicating compartments, a conduit communicating between said water chamber and said lower compartment, a second conduit communicating between said steam chamber and said lower compartment adjacent said disc, and an open-ended water lift tube fitting in an aperture of said disc and extending downwardly therefrom into said steam chamber to a plane below said firing tubes.

16. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes to terminate adjacent to but spaced from the closed ends thereof, means for heating said firing tubes, a steam dome arranged above said water and steam chambers, said steam dome comprising a closed housing having an apertured disc dividing said dome into upper and lower communicating compartments, a stationary impeller disposed below and in close proximity to said disc, a conduit communicating between said water chamber and said lower compartment, a second conduit communicating between said steam chamber and said stationary impeller, and an open-ended water lift tube fitting in an aperture of said disc and extending downwardly therefrom into said steam chamber to a plane below said firing tubes.

17. A steam generator comprising a generator head divided into a water chamber and a steam chamber, a plurality of rows of firing tubes that are in open communication with said steam chamber, said firing tubes extending from said steam chamber with the remote ends thereof being closed, a plurality of open-ended water tubes that are in open communication with said water chamber and extending therefrom within said firing tubes to terminate adjacent to but spaced from the closed ends thereof, means for heating said firing tubes, a steam dome arranged above said water and steam chambers, said steam dome comprising a closed housing having an apertured disc dividing said dome into upper and lower compartments, a stationary impeller disposed below and in close proximity to said disc, said disc and said impeller being of substantially less diameter than the inside diameter of said dome, a baffle extending radially inwardly from the wall of said dome and terminating in a spaced relation from said disc and impeller to permit communication between said compartments, a conduit communicating between said water chamber and said lower compartment, a second conduit communicating between said steam chamber and said impeller, and an open-ended water lift tube fitting in the aperture of said disc and extending downwardly therefrom into said steam chamber to a plane below said firing tubes.

18. A steam generator comprising a water chamber, a steam chamber, a plurality of firing tubes in open communication with said steam chamber, said firing tubes extending from said steam chamber with the remote ends thereof being closed, a plurality of open-ended water tubes that are in open communication with said water chamber and extending therefrom within said firing tubes for termination adjacent to but spaced from the closed ends thereof, and means for heating said firing tubes, said firing tubes and said water tubes being formed of metal having different coefficients of expansion whereby the spacing of the open ends of said water tubes from the closed ends of said firing tubes is variable in accordance with the temperature whereby the supply of water through said water tubes to said firing tubes is controlled.

19. A steam generator comprising a water chamber, a steam chamber, a plurality of firing tubes in open communication with said steam chamber, said firing tubes extending from said steam chamber with the remote ends thereof being closed, a plurality of open-ended water tubes that are in open communication with said water chamber and extending therefrom within said firing tubes for termination adjacent to but spaced from the closed ends thereof, and means including a firing chamber into which said firing tubes extend for heating the same, said firing tubes and said water tubes being formed of metal having different coefficients of expansion whereby the spacing of the open ends of said water tubes from the closed ends of said firing tubes is variable in accordance with the temperature whereby the supply of water through said water tubes to said firing tubes is controlled and said steam chamber being interposed between said water chamber and said firing chamber whereby one wall of said steam chamber is directly heated by said heating means.

20. In a steam generator having a firing tube communicating with a steam chamber at one end and closed at the other end, an open-ended water tube communicating with a water chamber at one end and nested within said firing tube having the other end thereof positioned adjacent to but spaced from the closed end of said firing tube, and means for circulating water from said water tube to said firing tube, the improvement in which the firing tube and the water tube are formed of metals having different coefficients of expansion whereby the spacing of an open end of said water tube from the adjacent closed end of said firing tube is variable in accordance with the temperature applied to said firing tube.

21. A steam generator comprising a generator head having a partition dividing it into a water chamber and a steam chamber, a plurality of firing tubes in open communication with said steam chamber, said firing tubes extending from said steam chamber with the remote ends thereof being closed, a plurality of open-ended water tubes that are in open communication with said water chamber and extending therefrom through said steam chamber to within said firing tubes for termination adjacent to but spaced from the closed ends thereof, means for heating said tubes for supplying steam to said steam chamber, a support for each of said water tubes located in said partition, each of said supports being in coaxial alignment with the open end of a corresponding firing tube within said steam chamber and having a passage communicating between said steam and water chambers, and valve means on each support for controlling each passage, said valve means being operated by entrained particles of water in the steam projected into said steam chamber from said corresponding firing tube against said support whereby said entrained water passes to said water chamber.

22. The steam generator recited in claim 21 in which each of said supports has associated therewith an annular skirt projecting into said steam chamber for directing said entrained water to each of said passages.

23. The steam generator recited in claim 21 in which each of said supports has associated therewith an annular skirt projecting into said steam chamber for directing said entrained water to each of said passages, each of said skirts being provided with a plurality of perforations to permit ready escape of steam into said steam chamber.

WALTER W. WILLIAMS.